US012803881B2

(12) United States Patent
Wang et al.

(10) Patent No.: US 12,803,881 B2
(45) Date of Patent: Nov. 17, 2026

(54) METHOD, ELECTRONIC DEVICE, AND COMPUTER PROGRAM PRODUCT FOR INFORMATION-CENTRIC NETWORKING

(71) Applicant: Dell Products L.P., Round Rock, TX (US)

(72) Inventors: Zijia Wang, WeiFang (CN); Jiacheng Ni, Shanghai (CN); Jinpeng Liu, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 1051 days.

(21) Appl. No.: 17/858,670

(22) Filed: Jul. 6, 2022

(65) Prior Publication Data

US 2023/0403204 A1 Dec. 14, 2023

(30) Foreign Application Priority Data

Jun. 10, 2022 (CN) ......................... 202210657563.2

(51) Int. Cl.
*H04L 41/16* (2022.01)
*G06N 20/00* (2019.01)
*H04L 67/568* (2022.01)

(52) U.S. Cl.
CPC ............. *H04L 41/16* (2013.01); *G06N 20/00* (2019.01); *H04L 67/568* (2022.05)

(58) Field of Classification Search
CPC ........ H04L 41/16; H04L 67/568; G06N 20/00
See application file for complete search history.

(56) References Cited

U.S. PATENT DOCUMENTS

| | | | | |
|---|---|---|---|---|
| 11,218,561 | B1 * | 1/2022 | Mondal | H04L 41/12 |
| 2008/0240138 | A1 * | 10/2008 | Hirano | H04L 12/66 370/408 |
| 2020/0320002 | A1 * | 10/2020 | Doddaiah | G06N 3/08 |
| 2022/0019541 | A1 * | 1/2022 | Dubey | G06F 12/0875 |
| 2022/0245513 | A1 * | 8/2022 | Wang | H04L 67/1097 |

(Continued)

FOREIGN PATENT DOCUMENTS

CN 113596138 A 11/2021

OTHER PUBLICATIONS

Amadeo et al., "Information-Centric Networking for the Internet of Things: Challenges and Opportunities," IEEE Network (vol. 30, Issue: 2), Mar.-Apr. 2016, pp. 92-100. (Year: 2016).*

(Continued)

*Primary Examiner* — Kyle R Stork
(74) *Attorney, Agent, or Firm* — Ryan, Mason & Lewis, LLP

(57) ABSTRACT

Embodiments of the present disclosure provide a method, an electronic device, and a computer program product for information-centric networking. In the method, a memory layer in a machine learning model is used to obtain, on the basis of an environmental state obtained from information-centric networking at a future moment, future information associated with a memory layer corresponding to the future moment, and the machine learning model is trained using the future information. By means of the solution, a model trained using future information can be obtained. By use of the model, information-centric networking based on reinforcement learning achieves a more efficient cache mechanism.

20 Claims, 5 Drawing Sheets

(56) References Cited

U.S. PATENT DOCUMENTS

| | | | | |
|---|---|---|---|---|
| 2022/0350484 | A1* | 11/2022 | Vankamamidi | G06F 12/126 |
| 2023/0072887 | A1* | 3/2023 | Ito | H01L 21/67051 |
| 2023/0195428 | A1* | 6/2023 | Deng | G06F 8/447<br>717/110 |
| 2023/0244970 | A1* | 8/2023 | Xu | G06N 5/01<br>706/52 |
| 2023/0410290 | A1* | 12/2023 | Desai | G06V 40/171 |

OTHER PUBLICATIONS

N. R. Ke et al., "Learning Dynamics Model in Reinforcement Learning by Incorporating the Long Term Future," arXiv:1903.01599v2, Mar. 16, 2019, 14 pages.

N. Laoutaris et al., "The LCD Interconnection of LRU Caches and Its Analysis," Performance Evaluation, vol. 63, No. 7, Jul. 2006, 33 pages.

Chinese Search Report of Application No. 2022106575632 dated Dec. 11, 2025, 2 pages.

* cited by examiner

METHOD, ELECTRONIC DEVICE, AND COMPUTER PROGRAM PRODUCT FOR INFORMATION-CENTRIC NETWORKING

RELATED APPLICATION(S)

The present application claims priority to Chinese Patent Application No. 202210657563.2, filed Jun. 10, 2022, and entitled "Method, Electronic Device, and Computer Program Product for Information-Centric Networking," which is incorporated by reference herein in its entirety.

FIELD

Embodiments of the present disclosure relate to the field of computers, and more particularly, to a method, an electronic device, and a computer program product for information-centric networking.

BACKGROUND

Information-centric networking (ICN) is an attempt to change the focus of a current Internet architecture. A previous architecture focuses on establishing a conversation between two machines. An ICN architecture can realize functions such as content and location separation and network built-in caching, so as to better meet the needs of large-scale network content distribution, mobile content access, network flow balance, and the like.

Reinforcement learning (RL), as one of the paradigms and methodologies of machine learning, is used to describe and solve the problem that agents achieve reward maximization or a particular objective by means of a learning strategy during interaction with an environment. RL is more and more popular due to its flexibility and good performance, and has been studied in fields such as game theory, cybernetics, operations research, information theory, and simulation library optimization.

SUMMARY

Embodiments of the present disclosure provide a solution for ICN.

In a first aspect of the present disclosure, a method is provided. The method includes: performing forward processing on a first state obtained from ICN at a first moment using a memory layer in a machine learning model, and determining a forward hidden state associated with a memory layer corresponding to the first moment, wherein the first state comprises first node information and first topological information about the ICN; performing backward processing on a second state obtained from the ICN at a second moment using the memory layer, and determining a backward hidden state associated with a memory layer corresponding to the second moment, wherein the second moment is later than the first moment; determining a third state at the second moment using the forward hidden state and the backward hidden state; and training the machine learning model using the second state and the third state.

In a second aspect of the present disclosure, an electronic device is provided. The electronic device includes at least one processor; and at least one memory storing computer-executable instructions, the at least one memory and the computer-executable instructions being configured to cause, together with the at least one processor, the electronic device to perform operations. The operations include: performing forward processing on a first state obtained from ICN at a first moment using a memory layer in a machine learning model, and determining a forward hidden state associated with a memory layer corresponding to the first moment, wherein the first state comprises first node information and first topological information about the ICN; performing backward processing on a second state obtained from the ICN at a second moment using the memory layer, and determining a backward hidden state associated with a memory layer corresponding to the second moment, wherein the second moment is later than the first moment; determining a third state at the second moment using the forward hidden state and the backward hidden state; and training the machine learning model using the second state and the third state.

In a third aspect of the present disclosure, a computer program product is provided. The computer program product is tangibly stored in a non-transitory computer-readable medium and includes computer-executable instructions, wherein when executed by a device, the computer-executable instructions cause the device to perform operations comprising: performing forward processing on a first state obtained from ICN at a first moment using a memory layer in a machine learning model, and determining a forward hidden state associated with a memory layer corresponding to the first moment, wherein the first state comprises first node information and first topological information about the ICN; performing backward processing on a second state obtained from the ICN at a second moment using the memory layer, and determining a backward hidden state associated with a memory layer corresponding to the second moment, wherein the second moment is later than the first moment; determining a third state at the second moment using the forward hidden state and the backward hidden state; and training the machine learning model using the second state and the third state.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure.

DETAILED DESCRIPTION

Figure 1A:
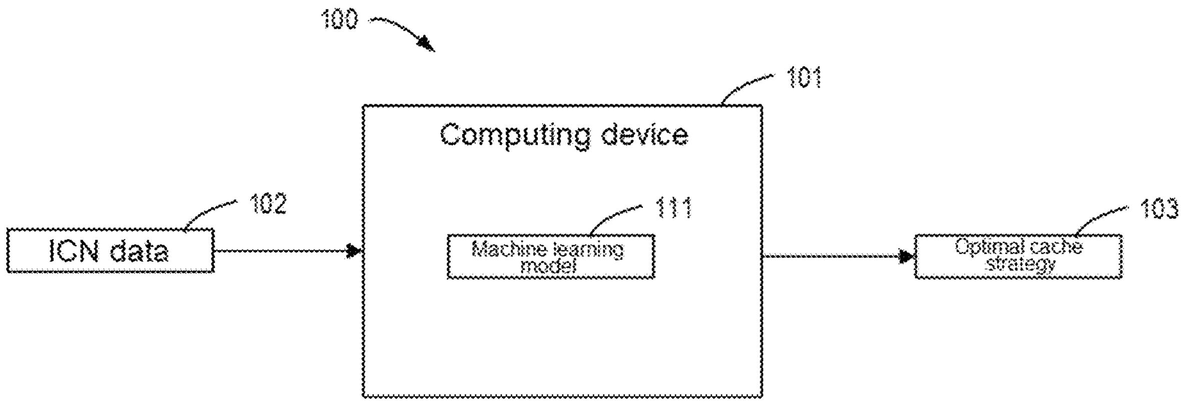
FIG. 1A illustrates a schematic diagram of an example environment in which embodiments of the present disclosure can be implemented.

Principles of the present disclosure will be described below with reference to several example embodiments illustrated in the accompanying drawings. Although the drawings show example embodiments of the present disclosure, it should be understood that these embodiments are merely described to enable those skilled in the art to better understand and further implement the present disclosure, and not to limit the scope of the present disclosure in any way.

As used herein, the term "include" and variations thereof mean open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As used herein, the term "machine learning" refers to processing involving high-performance computing, machine learning, and artificial intelligence algorithms. Herein, the term "machine learning model" may also be referred to as a "learning model," "learning network," "network model," or "model." A "neural network" or "neural network model" is a deep learning model. In general, a machine learning model is capable of receiving input data, performing predictions based on the input data, and outputting prediction results.

Generally, a machine learning model may include multiple processing layers, each processing layer having multiple processing units. The processing units are sometimes also referred to as convolution kernels. In a convolution layer of a convolution neural network (CNN), processing units are referred to as convolution kernels or convolution filters. Processing units in each processing layer perform corresponding changes on inputs of that processing layer based on corresponding parameters. An output of the processing layer is provided as an input to the next processing layer. An input to the first processing layer of the machine learning model is a model input to the machine learning model, and an output of the last processing layer is a model output of the machine learning model. Inputs to the intermediate processing layers are sometimes also referred to as features extracted by the machine learning model. Values of all parameters of the processing units of the machine learning model form a set of parameter values of the machine learning model.

Machine learning can mainly be divided into three stages, namely, a training stage, a testing stage, and an application stage (also referred to as an inference stage). During the training stage, a given machine learning model can be trained using a large number of training samples and iterated continuously until the machine learning model can obtain, from the training samples, consistent inferences which are similar to the inferences that human intelligence can make. Through training, the machine learning model may be considered as being capable of learning a mapping or an association relationship between inputs and outputs from training data. After training, a set of parameter values of the machine learning model is determined. In the testing stage, the trained machine learning model may be tested by using test samples to determine the performance of the machine learning model. In the application stage, the machine learning model can be used to process, based on the set of parameter values obtained from the training, actual input data to provide corresponding outputs.

A node in the ICN can cache a data subset and is used for providing a fast data access for a client and reducing a traffic pressure on a source server at the same time. A cache node can be located on a local device (such as an internal memory of a smart phone), can be located on an edge of a network (such as a content distribution network (CDN)) near a database server (such as Redis), or can be located on both the local device and the edge. ICN solves the problems of network congestion or low data transmission efficiency in other architectures to a certain extent, but for ICN, an efficient cache mechanism is still urgently needed. In view of this demand, the present disclosure provides a technical solution for applying RL to ICN, so as to provide an efficient cache mechanism.

RL can be divided into model-based RL and model-free RL according to whether it depends on a model. What the two types have in common is that data is obtained by interaction with an environment, and the two types differ in how the data is used. Model-free RL directly uses data obtained by interaction with an environment to improve its behaviors. Model-based RL uses data obtained by interaction with an environment to learn a model, and then makes a sequential decision on the basis of this model. In general, model-based RL is more efficient than model-free RL because an agent can use model information as it explores an environment, allowing the agent to converge to an optimal policy more quickly. However, model-based RL has a very challenging design because a model is required to accurately reflect a real environment. Therefore, if a model in an agent fails to provide wise long-term predictions, the agent will make a wrong decision, thereby causing a failure of this RL process and adversely affecting the cache in the ICN.

In order to at least solve the above problems, an improved solution for the ICN is provided in an example embodiment of the present disclosure. In this solution, on the basis of an environmental state obtained from an ICN at a current moment, a forward hidden state associated with a memory layer corresponding to the current moment is obtained using a memory layer (e.g., a Long Short-Term Memory (LSTM) layer) in a machine learning model; on the basis of an environmental sate obtained from the ICN at a future moment, a backward hidden state associated with a memory layer corresponding to the future moment is obtained; and in addition, the machine learning model is trained using the backward hidden state.

By means of this solution, in the process of training the machine learning model, future information is introduced using the LSTM layer, so as to learn a more accurate model. In this way, an RL-based ICN can achieve a faster and more accurate efficient cache mechanism using this learned model.

FIG. 1A is a schematic diagram of example environment 100 in which a plurality of embodiments of the present disclosure can be implemented. Example environment 100 includes computing device 101.

Computing device 101 can train machine learning model 111 according to data 102 obtained from the ICN. Data 102 includes data used for expressing an environmental state of the ICN. The environmental state at least includes topological information and node information of an ICN architecture. Computing device 101 can also quickly obtain optimal cache strategy 103 of the ICN using trained machine learning model 111.

Example computing device 101 includes, but is not limited to, a personal computer, a server computer, a handheld or laptop device, a mobile device (such as a mobile phone, a personal digital assistant (PDA), and a media player), a multi-processor system, a consumer electronic product, a minicomputer, a mainframe computer, a distributed computing environment including any of the above systems or devices, and the like. Among them, the server can be a cloud server, which is also referred to as a cloud computing server or a cloud host and is a host product in a cloud computing service system, so as to solve the defects of high management difficulty and low business extensibility of services in a traditional physical host and a Virtual Private Server (VPS). The server may also be a server of a distributed system, or a server combined with a block chain.

Figure 1B:
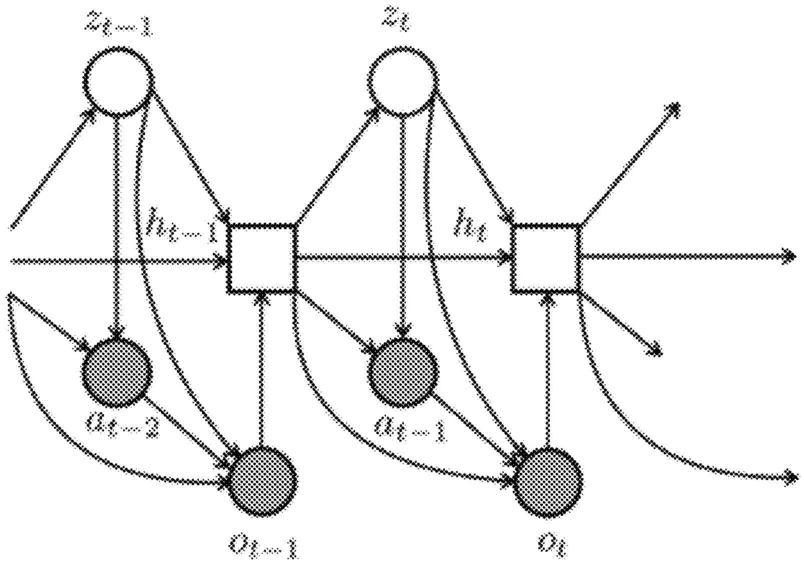
FIG. 1B illustrates a schematic diagram of an inference in a machine learning model.

FIG. 1B illustrates a schematic diagram of an inference in machine learning model 111. Machine learning model 111 may include a plurality of LSTM layers. As an example, FIG. 1B only illustrates blocks of two LSTM layers. It should be understood that the number of LSTM layers and a specific structure of each block may be randomly determined according to an actual need. In FIG. 1B, $a_{t-1}$ represents an action at moment t−1; $a_{t-2}$ represents an action at moment t−2; $o_{t-1}$ represents a state observed at moment t−1; $o_t$ represents a state observed at moment t; $h_{t-1}$ represents a hidden state (which can also be referred to as a forward hidden state since $h_{t-1}$ is a hidden state obtained by an LSTM layer from a forward time sequence (i.e., a sequence backward from moment 1 to moment T)) of an LSTM layer that processes an input at moment t−1; $h_t$ represents a hidden state of the LSTM layer that processes an input at moment t; $z_t$ is a hidden variable at moment t in machine learning model 111; $z_{t-1}$ is a hidden variable at moment t−1 in machine learning model 111, wherein moment t may be any moment between moment 1 to moment T.

A prediction probability distribution obtained according to machine learning model 111 as shown in FIG. 1B is as shown in following Equation (1):

$$p_\theta(o_{1:T}, a_{1:T} \mid o_0, h_0) = \int \prod_{t=1}^{T} p_\theta(o_t \mid a_{t-1}, h_{t-1}, z_t) p_\theta(a_{t-1} \mid h_{t-1}, z_t) p_\theta(z_t \mid h_{t-1}) dz \quad \text{Equation (1)}$$

where $p_\theta(o_t|a_{t-1}, h_{t-1}, z_t)$ is a state decoder distribution under the conditions of previous action $a_{t-1}$, hidden state $h_t$ and hidden variable $z_t$; $p_\theta(a_{t-1}|h_{t-1}, z_t)$ is an action decoder distribution under the conditions of hidden state $h_{t-1}$ and hidden variable $z_t$; and $p_\theta(z_t|h_{t-1})$ is a distribution of hidden variables under the condition of hidden state $h_{t-1}$. These distributions above can be represented by simple distributions such as Gaussian distributions. Their means and standard deviations are calculated using the plurality of LSTM layers. Although each single distribution is unimodal, peripherization of a hidden variable sequence enables $p_\theta(o_{1:T}, a_{1:T}|o_0)$ to have high multimodality. It should be noted that a prior distribution of a random hidden variable at moment t depends on all the previous inputs by means of hidden state $h_{t-1}$. The prior distribution of this time structure improves the representation ability of a hidden variable.

Example embodiments for ICN in the present disclosure will be discussed in more detail below with reference to the accompanying drawings.

Figure 2:
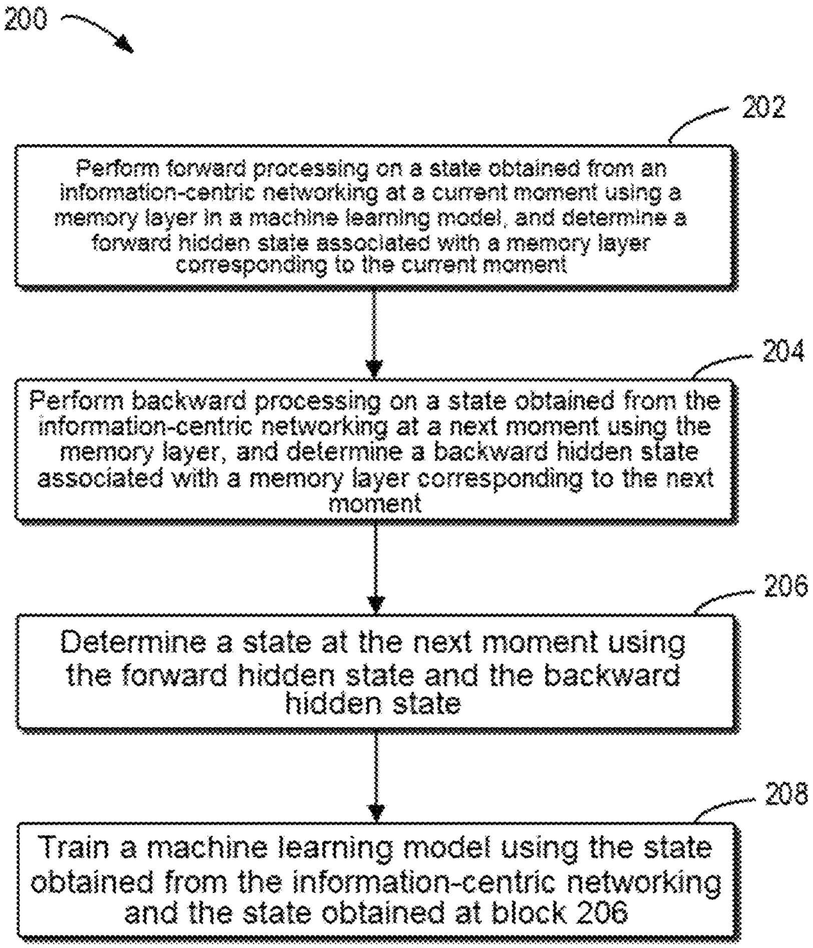
FIG. 2 illustrates a flow chart of a method for ICN according to some embodiments of the present disclosure.

First referring to FIG. 2, a flow chart of a method 200 is shown for an ICN according to some embodiments of the present disclosure. Method 200 can be applicable to training machine learning model 111 in computing device 101.

At block 202, forward processing is performed on a state (first state) obtained from an ICN at a current moment (first moment) using a memory layer (e.g., an LSTM layer) in a machine learning model, and a forward hidden state associated with a memory layer corresponding to the current moment is determined. The state obtained from the ICN includes node information and topological information at the current moment. The first state may be data 102.

In some embodiments, the node information includes a node type, a cache state, and a content attribute. The node type includes a source node, a target node, and an intermediate node. The source node can be a node that stores data. The target node can be a node that requests for data. The intermediate node may be a node that temporarily stores data during transmission of the data from the source node to the target node. The cache state can be used for representing a cache condition of data in each node, and may include an address of the data stored in each node. The content attribute can include an attribute of data stored in each node, such as a data size and a data type. The topological information can be used for describing a topology of an ICN architecture diagram, for example, the number of nodes included in the ICN architecture diagram and connection relationships between the nodes in the ICN architecture diagram.

For example, the forward hidden state of the LSTM layer can be obtained by following Equation (2):

$$h_t = f(o_t, h_{t-1}, z_t) \quad \text{Equation (2)}$$

where f is a deterministic nonlinear transition function (which can also be a linear transition function); $o_t$ is a state received from the ICN at moment t; $h_{t-1}$ is the forward hidden state of the LSTM layer performing forward processing at moment t−1; $z_t$ is a hidden variable at moment t; a prior distribution of the hidden variable can be obtained using the aforementioned $h_{t-1}$; and generally, a posterior distribution of the hidden variable can be represented by $p(z_t|h_{t-1}, a_{t-1:T}, o_{t:T}, z_{t+1:T})$. In order to achieve an effective posterior estimation for $z_t$, the present disclosure abandons the dependence of the posterior distribution on action $a_{t-1:T}$ and future hidden variables. Although the posterior distribution depends on future action $a_{t-1:T}$ in principle, the present disclosure has experimentally proved that action $a_{t-1:T}$ has no obvious impact on the final performance, so the present disclosure selects to abandon the dependency on action $a_{t-1:T}$ to simplify computation. The dependence of the posterior distribution on state $o_{t:T}$ from moment t to moment T, which will be further described at block 204.

At block 204, backward processing is performed on a state (second state) obtained from the ICN at a next moment (second moment later than the first moment) using the memory layer (e.g., an LSTM layer), and a backward hidden state associated with a memory layer corresponding to the next moment is determined. It should be understood that "backward" and "forward" herein refer to forward or backward in time, respectively. Contrary to the forward hidden state, the backward hidden state is a hidden state obtained by the LSTM layer on a backward time sequence (i.e., a sequence from moment T to moment 1).

Figure 3:
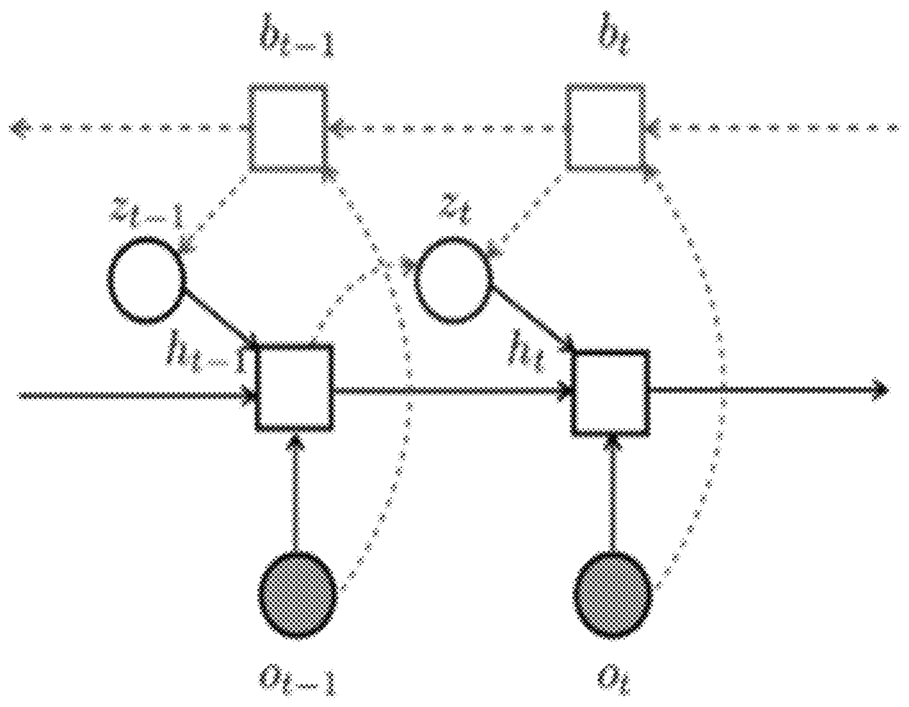
FIG. 3 illustrates a schematic diagram of an inference in a machine learning model according to some embodiments of the present disclosure.

FIG. 3 illustrates a schematic diagram of an inference in a machine learning model according to some embodiments of the present disclosure. As shown in FIG. 3, backward hidden state $b_{t-1}$ of the LSTM layer performing backward processing at time t−1 can be obtained using environmental state $o_{t-1}$ obtained from the ICN at moment t−1 and backward hidden state $b_t$ corresponding to moment t. Similarly, backward hidden state $b_t$ can be obtained using environmental state $o_t$ obtained from the ICN at moment t and backward hidden state $b_{t+1}$ corresponding to moment t+1. Specifically, it can be obtained by following Equation (3):

$$b_t=g(o_t,b_{t+1}) \quad \text{Equation (3)}$$

where g is a deterministic transition function. It should be understood that when $b_t$ is backward hidden state $b_T$ corresponding to last moment T, $b_t$ may be completely determined by environmental state $o_T$ obtained from the ICN at moment T. In this way, $b_t$ carries information of future environmental state $o_{t:T}$ obtained from moment t to moment T. Therefore, backward hidden state $b_t$ may also be referred to as future information herein. By means of introduction of backward hidden state $b_t$, the posterior distribution of $z_t$ is implemented depending on the inference of state $o_{t:T}$ from future moment t to moment T. A posterior distribution of a hidden variable can be implemented using $q_\Phi(z_t|h_{t-1}, b_t)$, and this posterior distribution can be used for prediction of a state at block 206.

At block 206, a state (third state, i.e., a state predicted by a model) at a next moment (future moment or second moment) is determined using the forward hidden state and the backward hidden state In some embodiments, the determination of the state at the next moment may be implemented in the following manner. Based on the forward hidden state and the backward hidden state, a hidden variable at the next moment is determined. For example, the hidden variable at the next moment can be obtained using $q_\Phi(z_t|h_{t-1}, b_t)$ on the basis of forward hidden state $h_{t-1}$ corresponding to the current moment and backward hidden state $b_t$ corresponding to the next moment. An action for the first state at the current moment is predicted on the basis of the forward hidden state and the hidden variable. For example, an action at the current moment can be obtained using $p_\Theta(a_{t-1}|h_{t-1}, z_t)$ on the basis of forward hidden state $h_{t-1}$ at the current moment and hidden variable $z_t$ at the next moment. The third state is predicted on the basis of the action, the forward hidden state, and the hidden variable. For example, predicted state $o_t$ at the next moment can be obtained using $p_\Theta(o_t|a_{t-1}, h_{t-1}, z_t)$ on the basis of action $a_{t-1}$ at the current moment, forward hidden state $h_{t-1}$ at the current moment, and hidden variable $z_t$ at next moment.

The state (the third state, i.e., the state predicted by the model) obtained at block 206 is used for training a machine learning model at block 208.

At block 208, a machine learning model (such as machine learning model 111) is trained using the state received from the ICN and the state obtained at block 206.

In some embodiments, the machine learning model can be trained in the following manner. A loss value of a loss function corresponding to the machine learning model is determined according to the state received from the ICN and the state obtained at block 206. For example, Evidence Lower Bound (ELBO)

$$\mathbb{E}_{q_\phi(z_{1:T}|o_0,a_{0:T})}\left[\frac{\log p_\theta(o_{1:T}, a_{1:T}, z_{1:T} \mid o_0, h_0)}{\log q_\phi(z_{1:T} \mid o_{0:T}, a_{0:T})}\right]$$

taking an output probability distribution $p_\Theta(o_{1:T}, a_{1:T}|o_0, h_0)$ of the machine learning model as an evidence can be obtained according to following Equation (4):

$$\begin{aligned}\log p_\theta(o_{1:T}, a_{1:T}, z_{1:T} \mid o_0, h_0) \geq \quad &\text{Equation (4)}\\ \mathbb{E}_{q_\phi(z_{1:T}|o_0,a_{0:T})}\left[\frac{\log p_\theta(o_{1:T}, a_{1:T}, z_{1:T} \mid o_0, h_0)}{\log q_\phi(z_{1:T} \mid o_{0:T}, a_{0:T})}\right] = &\\ \mathbb{E}_{q_\phi(z_{1:T}|o_0,a_{0:T})}[\log p_\theta(o_{1:T}, a_{1:T} \mid o_0, h_0, z_{1:T})] - &\\ \mathbb{KL}(q_\phi(z_{1:T} \mid o_0, a_{0:T}) \| p_\phi(z_{1:T} \mid o_0, h_0))&\end{aligned}$$

Considering the future information at block 204, the ELBO can be expressed using following Equation (5):

$$\begin{aligned}\mathcal{L}(o_{1:T}, a_{1:T}; \theta, \phi) = \quad &\text{Equation (5)}\\ \sum_t \mathbb{E}_{q_\phi(z_t|h_{t-1},b_t)}[\log p_\theta(o_t \mid a_{t-1}, h_{t-1}, z_t) + \log &\\ p_\theta(a_{t-1} \mid h_{t-1}, z_t)] - \mathbb{KL}(q_\phi(z_t \mid h_{t-1}, b_t) \| p_\theta(z_t \mid h_{t-1}))&\end{aligned}$$

Equation (5) is a loss function. The machine learning model can be trained on the basis of the loss value of the loss function.

Through the above method, in the process of training the machine learning model, future-based information is introduced using an LSTM layer, thus providing a machine learning model that can provide an optimal cache strategy for the ICN cache mechanism.

The present disclosure considers that, with regard to the hidden variable, the problem is how to learn meaningful hidden variables to represent high-level abstraction of observed state data. It is a challenge to combine a powerful autoregressive state decoder with a hidden variable to enable the hidden variable to carry useful future information. The following cases may possibly exist: the hidden variable is not used, and the entire information is captured by a state decoder, or the model learns a static autoencoder focusing on single observation. The above is usually due to two main reasons: approximate posterior provides weak signals, or models that focus on short-term reconstruction. In order to solve the latter problem, the present disclosure is designed to force the hidden variable to carry useful information about the observed future state. Thus, when inferred hidden variable $z \sim q_\Theta(z|h, b)$ is known, condition generation model $p_\zeta(b|z)$ of backward hidden state b is trained. This condition generation model is trained by the following logarithmic likelihood maximization:

$$\max_\zeta \mathbb{E}_{q_\theta(z|b,h)}[\log p_\zeta(b \mid z)] \quad \text{Equation (6)}$$

The above loss function will be used as a training regularizer to force the hidden variable to encode the future information.

In some embodiments, the loss value of the loss function used for training machine learning model 111 may be determined in conjunction with Equation (6). That is, the loss function may include a maximum likelihood estimation model determined for the backward hidden state generated under the condition of the hidden variable. Therefore, the loss function obtained in conjunction with Equation (6) can be expressed by following Equation (7):

$$\mathcal{L}(o_{1:T}, a_{1:T}; \theta, \phi, \zeta) = \sum_t \mathbb{E}_{q_\phi(z_t|h_{t-1},b_t)}[\log p_\theta(o_t \mid a_{t-1}, h_{t-1}, z_t) + \log p_\theta(a_{t-1} \mid h_{t-1}, z_t) + \beta \log p_\zeta(b_t \mid z_t)] - \mathbb{KL}(q_\phi(z_t \mid h_{t-1}, b_t) \| p_\theta(z_t \mid h_{t-1})) \quad \text{Equation (7)}$$

After the trained machine learning model is obtained through blocks 202 to 208, the trained machine learning model can be applied to an actual scenario to obtain optimal cache strategy 103. Therefore, in some embodiments, the method of the present disclosure may also include: an action corresponding to node information (second node information) and topological information (second topological information) received from the ICN is generated using the trained machine learning model.

In the cache mechanism of the ICN, there are two cache stages. One stage is a cache decision stage for an ICN node, that is, for determining whether to perform data cache on a certain node. The other stage is a cache decision stage for a memory in an ICN node, that is, for determining whether to perform data cache on a certain memory in a certain node. This stage can implement data deletion and update at this node.

In some embodiments, at the cache decision stage for the ICN node, a corresponding action can be generated using the trained machine learning model on the basis of the node information (second node information) and the topological information (second topological information) received from the ICN. The action is indicative of performing data caching in the ICN node, or is indicative of performing no data caching in the ICN node.

For example, if the ICN has n nodes (n can be any positive integer), $2^n$ actions can be generated using the trained machine learning model to indicate $2^n$ possible cache decisions respectively. The action can be represented by a binary code. For example, when the ICN has node 1 and node 2 (i.e., n is 2), a possible action can be represented by 10 that refers to performing data caching on node 1 and performing no data caching on node 2.

In some embodiments, at the cache decision stage for the memory in the ICN node, a corresponding action can be generated using the trained machine learning model on the basis of the node information (second node information) and the topological information (second topological information) received from the ICN. The action is indicative of performing data caching in the memory of the ICN node, or is indicative of performing no data caching in the memory of the ICN node.

For example, if the ICN has n nodes, where node 1 has k memories, $n^k$ actions can be generated using the trained machine learning model for the entire ICN, while $2^k$ actions can be generated for node 1. For example, when the ICN has node 1 and node 2 (n is 2), and each node has memory 1 and memory 2 (k is 2), one possible action can be represented by 10 (a cache condition for node 1) 01 (a cache condition for node 2), where 10 refers to performing data caching on memory 1 in node 1 and performing no data caching on memory 2 in node 1, and 01 refers to performing no data caching on memory 1 in node 2 and performing data caching on memory 2 in node 2.

When an action generated by the machine learning model is applied to an actual environment, the action may cause the state of the actual environment to change. The actual environment can feed back a corresponding reward on the basis of the change of this state. Therefore, in some embodiments, the method of the present disclosure may also include receiving a feedback for the action. The feedback includes weights for a byte hit rate, a data response delay, and a data transmission bandwidth respectively. Known explanations in the art can be referred to for the byte hit rate, the data response delay, and the data transmission bandwidth. In order to avoid obscuring the present invention, such details are not repeated here.

For example, in the feedback, the weight of the byte hit rate may be 3, the weight of the data response delay may be 15, and the weight of the data transmission bandwidth may be 5, which shows that the data response delay attracts more attention in practical applications. It should be understood that the weight of the byte hit rate, the weight of the data response delay, and the weight of the data transmission bandwidth can be adaptively adjusted according to actual needs.

Moreover, in addition to the byte hit rate, data response delay, and data transmission bandwidth, other indicator weights can be selected as needed.

In addition, the trained machine learning model obtained through blocks 202 to 208 may be updated according to actual application scenarios. Therefore, the method of the present disclosure may also include: initialization configuration is performed on the state (first state) used for training, so as to update the trained machine learning model.

For example, when another node in the ICN is used as a new agent to train a machine learning model for RL, data can be collected from a new scenario for the new node, and the collected data can be allocated and stored to a memory pool for subsequent training of the machine learning model. The machine learning model in training updates a value function, and the model is then used for generating more simulated results. A new cycle begins, and the process will not end until a reward threshold is achieved. Such a training framework can be used for testing an RL algorithm and obtaining desired results.

Figure 4:
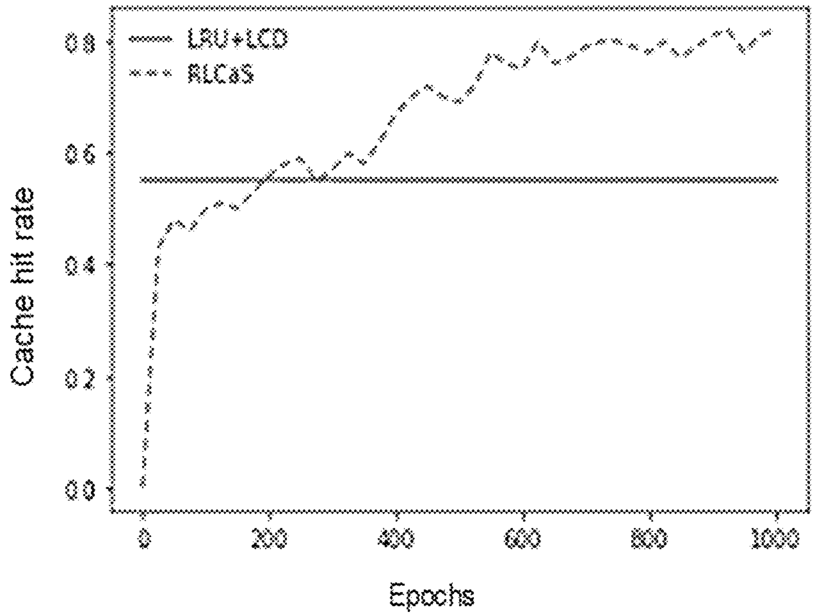
FIG. 4 illustrates an experimental result obtained using the method according to some embodiments of the present disclosure.
Figure 5:
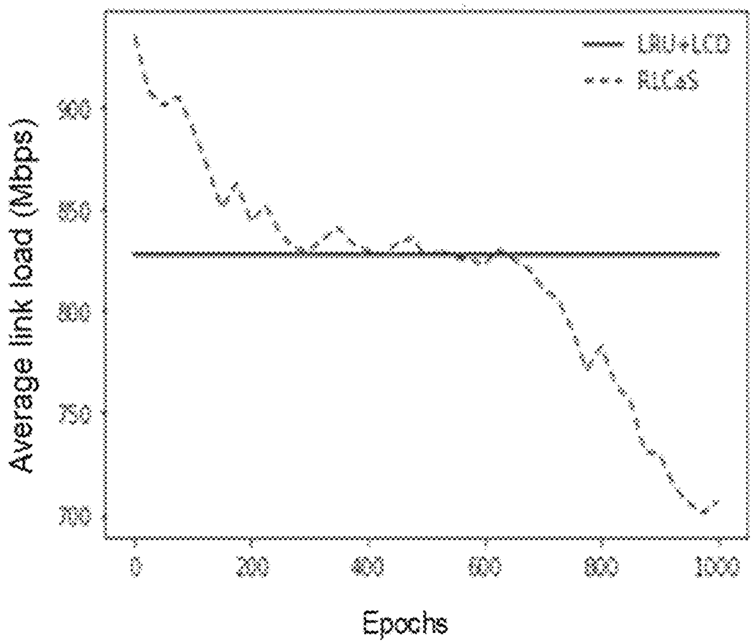
FIG. 5 illustrates an experimental result obtained using the method according to some embodiments of the present disclosure.

In order to further prove that the improved solution of the present disclosure has better performance, the method in an embodiment is tested. In an experiment, a Q network architecture is used. An RL agent is trained using Q learning. In order to obtain the topological information of the ICN, a Graph Convolutional Neural Network (GCN) is used as a feature extractor, and then a fully connected neural network is used to obtain a final Q value. In this experiment, an example method of the present disclosure, illustratively denoted in FIG. 4 and FIG. 5 as RLCaS to refer to an RL-based caching system, is compared with an LRU+LCD method in terms of an average cache hit rate and link load, where LRU denotes least recently used and LCD denotes leave copy down. Experimental results are shown in FIG. 4 and FIG. 5. It can be seen that the method provided in the present disclosure can implement a more accurate and efficient cache mechanism.

Figure 6:
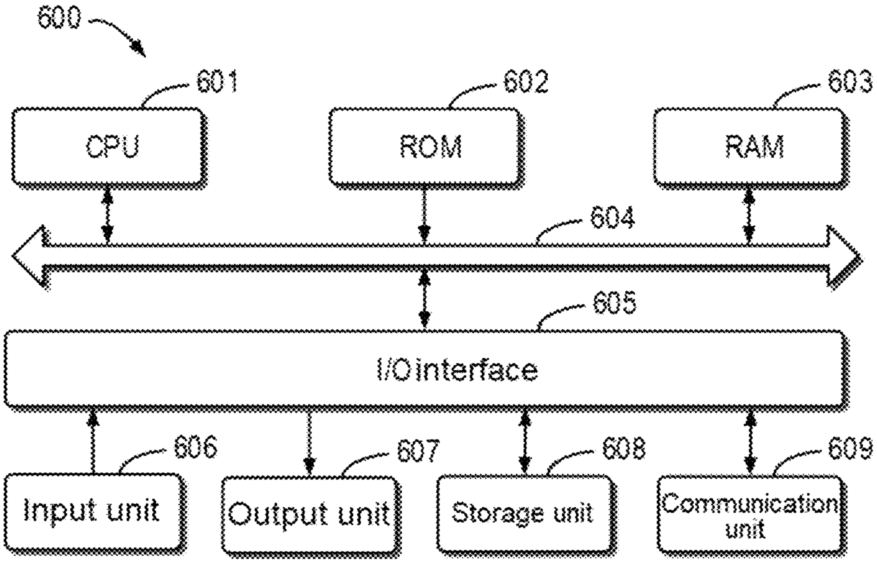
FIG. 6 is a block diagram of an example device that can be used for implementing embodiments of the present disclosure.

FIG. 6 is a schematic block diagram of example device 600 that can be used for implementing embodiments of the present disclosure. Device 600 may be used for implementing method 200 of FIG. 2.

As shown in FIG. 6, device 600 includes central processing unit (CPU) 601 that may perform various appropriate operations and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, such as method 200, may be performed by CPU 601. For example, in some embodiments, method 200 may be implemented as a computer software program that is tangibly included in a machine-readable medium such as storage unit 608. In some embodiments, part of or all the computer program may be loaded and/or installed onto device 600 via ROM 602 and/or communication unit 609. One or more operations of method 200 described above may be performed when the computer program is loaded into RAM 603 and executed by CPU 601.

Embodiments of the present disclosure include a method, a device, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/operations specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/operations specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or operations, or implemented by using a combination of special hardware and computer instructions.

Illustrative embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments or the improvements to technologies on the market, so as to enable other persons of ordinary skill in the art to understand the embodiments disclosed herein.

What is claimed is:

1. A method, comprising:

performing forward processing on a first state obtained from information-centric networking (ICN) at a first moment using a memory layer in a machine learning model, and determining a forward hidden state associated with a memory layer corresponding to the first moment, wherein the first state comprises first node information and first topological information about the ICN, the machine learning model comprising a processor-based reinforcement learning framework configured to generate rewards for respective actions relating to caching of data items in particular ones of a plurality of memories of particular ones of a plurality of nodes of the ICN, the processor-based reinforcement learning framework comprising a serial arrangement of a graph convolutional neural network and a fully-connected neural network, the graph convolutional neural network having inputs adapted to receive respective node information and topological information and an output coupled to an input of the fully-connected neural network, the actions being determined based at least on part on outputs of the fully-connected neural network, each of at least a subset of the nodes comprising multiple distinct ones of the memories for potential caching of data items, a given one of the rewards comprising a weighted combination of a plurality of cache performance indicators including at least a hit rate indicator, a response delay indicator and a transmission bandwidth indicator;

performing backward processing on a second state obtained from the ICN at a second moment using the memory layer, and determining a backward hidden state associated with a memory layer corresponding to the second moment, the second moment being later than the first moment;

determining a third state at the second moment using the forward hidden state and the backward hidden state;

training the machine learning model using the second state and the third state; and executing actions to cache data items in selected ones of the plurality of memories of selected ones of the plurality of nodes of the ICN based on rewards generated by the processor-based reinforcement learning framework of the trained machine learning model;

wherein the actions are generated by the trained machine learning model and comprise respective first and second different sets of one or more actions generated for at least a particular one of the plurality of nodes, with an action of the first set indicating whether or not a given data item is to be cached in the particular node of the plurality of nodes and an action of the second set indicating, responsive to the action of the first set indicating that the given data item is to be cached in the particular node, which of multiple distinct ones of the memories of the particular node is to be used to cache the given data item in the particular node.

2. The method according to claim 1, wherein the determining a third state at the second moment using the forward hidden state and the backward hidden state comprises:

determining a hidden variable at the second moment on the basis of the forward hidden state and the backward hidden state;

predicting an action for the first state at the first moment on the basis of the forward hidden state and the hidden variable; and predicting the third state on the basis of the action, the forward hidden state, and the hidden variable.

3. The method according to claim 2, wherein the training the machine learning model comprises:

determining, according to the second state and the third state, a loss value of a loss function corresponding to the machine learning model; and training the machine learning model on the basis of the loss value.

4. The method according to claim 3, wherein the loss function comprises: a maximum likelihood estimation model determined for the backward hidden state generated under the condition of the hidden variable.

5. The method according to claim 1, further comprising: generating an action corresponding to second node information and second topological information received from the ICN using the trained machine learning model.

6. The method according to claim 5, wherein the generating an action corresponding to second node information and second topological information received from the ICN comprises:

at a first cache decision stage for an ICN node, generating, on the basis of the second node information and the second topological information, a first action corresponding to the first cache decision stage, wherein the first action is indicative of:

performing data caching in the ICN node; or performing no data caching in the ICN node.

7. The method according to claim 6, wherein the generating a second action corresponding to second node information and second topological information received from the ICN also comprises:

at a second cache decision stage for a memory in the ICN node, generating, on the basis of the second node information and the second topological information, a second action corresponding to the second cache decision stage, wherein the second action is indicative of:

performing data caching in the memory of the ICN node; or performing no data caching in the memory of the ICN node.

8. The method according to claim 7, wherein the method also comprises:

receiving a feedback as at least a portion of the reward for the action, the feedback comprising weights for a byte hit rate, a data response delay, and a data transmission bandwidth, respectively.

9. The method according to claim 1, wherein the first node information comprises: a node type, a cache state, and a content attribute.

10. The method according to claim 1, wherein the method also comprises:

performing initialization configuration on the first state, so as to update the machine learning model.

11. An electronic device, comprising:

at least one processor; and at least one memory storing computer-executable instructions, wherein the computer-executable instructions, when executed by the at least one processor, cause the electronic device to perform operations comprising:

performing forward processing on a first state obtained from information-centric networking (ICN) at a first moment using a memory layer in a machine learning model, and determining a forward hidden state associated with a memory layer corresponding to the first moment, wherein the first state comprises first node information and first topological information about the ICN, the machine learning model comprising a processor-based reinforcement learning framework configured to generate rewards for respective actions relating to caching of data items in particular ones of a plurality of memories of particular ones of a plurality of nodes of the ICN, the processor-based reinforcement learning framework comprising a serial arrangement of a graph convolutional neural network and a fully-connected neural network, the graph convolutional neural network having inputs adapted to receive respective node information and topological information and an output coupled to an input of the fully-connected neural network, the actions being determined based at least on part on outputs of the fully-connected neural network, each of at least a subset of the nodes comprising multiple distinct ones of the memories for potential caching of data items, a given one of the rewards comprising a weighted combination of a plurality of cache performance indicators including at least a hit rate indicator, and a response delay indicator and a transmission bandwidth indicator;

performing backward processing on a second state obtained from the ICN at a second moment using the memory layer, and determining a backward hidden state associated with a memory layer corresponding to the second moment, the second moment being later than the first moment;

determining a third state at the second moment using the forward hidden state and the backward hidden state;

training the machine learning model using the second state and the third state; and executing actions to cache data items in selected ones of the plurality of memories of selected ones of the plurality of nodes of the ICN based on rewards generated by the processor-based reinforcement learning framework of the trained machine learning model;

wherein the actions are generated by the trained machine learning model and comprise respective first and second different sets of one or more actions generated for at least a particular one of the plurality of nodes, with an action of the first set indicating whether or not a given data item is to be cached in the particular node of the plurality of nodes and an action of the second set indicating, responsive to the action of the first set indicating that the given data item is to be cached in the particular node, which of multiple distinct ones of the memories of the particular node is to be used to cache the given data item in the particular node.

12. The electronic device according to claim 11, wherein the determining a third state at the second moment using the forward hidden state and the backward hidden state comprises:

determining a hidden variable at the second moment on the basis of the forward hidden state and the backward hidden state;

predicting an action for the first state at the first moment on the basis of the forward hidden state and the hidden variable; and predicting the third state on the basis of the action, the forward hidden state, and the hidden variable.

13. The electronic device according to claim 12, wherein the training the machine learning model comprises:

determining, according to the second state and the third state, a loss value of a loss function corresponding to the machine learning model; and training the machine learning model on the basis of the loss value.

14. The electronic device according to claim 13, wherein the loss function comprises: a maximum likelihood estimation determined for the backward hidden state generated under the condition of the hidden variable.

15. The electronic device according to claim 11, wherein the operations also comprise:

generating an action corresponding to second node information and second topological information received from the ICN using the trained machine learning model.

16. The electronic device according to claim 15, wherein the generating an action corresponding to second node information and second topological information received from the ICN comprises:

at a first cache decision stage for an ICN node, generating, on the basis of the second node information and the second topological information, a first action corresponding to the first cache decision stage, wherein the first action is indicative of:

performing data caching in the ICN node; or performing no data caching in the ICN node.

17. The electronic device according to claim 16, wherein the generating a second action corresponding to second node information and second topological information received from the ICN also comprises:

at a second cache decision stage for a memory in the ICN node, generating, on the basis of the second node information and the second topological information, a second action corresponding to the second cache decision stage, wherein the second action is indicative of:

performing data caching in the memory of the ICN node; or performing no data caching in the memory of the ICN node.

18. The electronic device according to claim 17, wherein the operations also comprise:

receiving a feedback as at least a portion of the reward for the action, the feedback comprising weights for a byte hit rate, a data response delay, and a data transmission bandwidth, respectively.

19. The electronic device according to claim 11, wherein the first node information comprises: a node type, a cache state, and a content attribute, and wherein the operations also comprise:

performing initialization configuration on the first state, so as to update the machine learning model.

20. A computer program product comprising a non-transitory computer-readable medium having computer-executable instructions stored therein, wherein the computer-executable instructions, when executed by a device, cause the device to perform operations comprising:

performing forward processing on a first state obtained from information-centric networking (ICN) at a first moment using a memory layer in a machine learning model, and determining a forward hidden state associated with a memory layer corresponding to the first moment, wherein the first state comprises first node information and first topological information about the ICN, the machine learning model comprising a processor-based reinforcement learning framework configured to generate rewards for respective actions relating to caching of data items in particular ones of a plurality of memories of particular ones of a plurality of nodes of the ICN, the processor-based reinforcement learning framework comprising a serial arrangement of a graph convolutional neural network and a fully-connected neural network, the graph convolutional neural network having inputs adapted to receive respective node information and topological information and an output coupled to an input of the fully-connected neural network, the actions being determined based at least on part on outputs of the fully-connected neural network, each of at least a subset of the nodes comprising multiple distinct ones of the memories for potential caching of data items, a given one of the rewards comprising a weighted combination of a plurality of cache performance indicators including at least a hit rate indicator, a response delay indicator and a transmission bandwidth indicator;

performing backward processing on a second state obtained from the ICN at a second moment using the memory layer, and determining a backward hidden state associated with a memory layer corresponding to the second moment, the second moment being later than the first moment;

determining a third state at the second moment using the forward hidden state and the backward hidden state;

training the machine learning model using the second state and the third state; and executing actions to cache data items in selected ones of the plurality of memories of selected ones of the plurality of nodes of the ICN based on rewards generated by the processor-based reinforcement learning framework of the trained machine learning model;

wherein the actions are generated by the trained machine learning model and comprise respective first and second different sets of one or more actions generated for at least a particular one of the plurality of nodes, with an action of the first set indicating whether or not a given data item is to be cached in the particular node of the plurality of nodes and an action of the second set indicating, responsive to the action of the first set indicating that the given data item is to be cached in the particular node, which of multiple distinct ones of the memories of the particular node is to be used to cache the given data item in the particular node.

* * * * *